United States Patent
Amiri et al.

(10) Patent No.: US 8,401,115 B2
(45) Date of Patent: Mar. 19, 2013

(54) DETECTOR USING LIMITED SYMBOL CANDIDATE GENERATION FOR MIMO COMMUNICATION SYSTEMS

(75) Inventors: Kiarash Amiri, Houston, TX (US); Raghavendar Mysore Rao, Austin, TX (US); Christopher H. Dick, San Jose, CA (US); Joseph R. Cavallaro, Pearland, TX (US)

(73) Assignee: Xilinx, Inc., San Jose, CA (US)

( * ) Notice: Subject to any disclaimer, the term of this patent is extended or adjusted under 35 U.S.C. 154(b) by 1057 days.

(21) Appl. No.: 12/045,786

(22) Filed: Mar. 11, 2008

(65) Prior Publication Data

US 2009/0232254 A1 Sep. 17, 2009

(51) Int. Cl.
*H04L 27/00* (2006.01)
(52) U.S. Cl. ........ 375/299; 375/265; 375/316; 375/340; 375/347; 375/267
(58) Field of Classification Search .................. 375/299, 375/265, 316, 340, 347, 267
See application file for complete search history.

(56) References Cited

U.S. PATENT DOCUMENTS

| | | | |
|---|---|---|---|
| 6,697,443 B1 * | 2/2004 | Kim et al. ...................... | 375/341 |
| 6,760,385 B1 * | 7/2004 | Goodson ....................... | 375/265 |
| 7,020,223 B2 * | 3/2006 | Vasquez ....................... | 375/341 |
| 7,245,666 B1 | 7/2007 | Gardner et al. | |
| 7,529,307 B2 | 5/2009 | Sandhu et al. | |
| 7,720,169 B2 | 5/2010 | Reuven et al. | |
| 2005/0078394 A1 * | 4/2005 | Cideciyan et al. .............. | 360/39 |
| 2006/0148506 A1 | 7/2006 | Hoo | |
| 2006/0171483 A1 | 8/2006 | Jia et al. | |
| 2007/0162827 A1 * | 7/2007 | Walton et al. .................. | 714/774 |
| 2008/0089446 A1 * | 4/2008 | Lee et al. ...................... | 375/333 |
| 2008/0095281 A1 | 4/2008 | Hosur et al. | |
| 2008/0107196 A1 | 5/2008 | Won | |
| 2008/0140743 A1 * | 6/2008 | Lee et al. ...................... | 708/207 |

(Continued)

FOREIGN PATENT DOCUMENTS

WO WO 2008/027554 A3 3/2008

OTHER PUBLICATIONS

Chin, W. H., "QRD Based Tree Search Data Detection for MIMO Communication System," *Proc. of the IEEE 61st Semiannual Vehicular Technology Conference*, May 30-Jun. 1, 2005, pp. 1624-1627, vol. 3, Stockholm, Sweden.

(Continued)

*Primary Examiner* — Sam K Ahn
*Assistant Examiner* — Leila Malek
(74) *Attorney, Agent, or Firm* — LeRoy D. Maunu

(57) ABSTRACT

A circuit detects symbols transmitted from multiple transmitting antennas to multiple receiving antennas. A distance block for an initial transmitting antenna in an ordering of the transmitting antennas determines a distance value for each symbol in a constellation. A selector block selects a limited number of candidates for the initial transmitting antenna from the symbols having smaller distance values. For each first and successive second transmitting antenna in the ordering, a distance-selector block selects a candidate for the second transmitting antenna for each candidate for the first transmitting antenna. The candidate for the second transmitting antenna is a pairing having a smaller distance value among the pairings of the candidate for the first transmitting antenna and the symbols. An identifier block selects a last candidate having a smaller distance value among the candidates for a last transmitting antenna in the ordering. The last candidate includes the detected symbols.

18 Claims, 5 Drawing Sheets

U.S. PATENT DOCUMENTS

| | | | |
|---|---|---|---|
| 2008/0144746 A1 | 6/2008 | Waters et al. | |
| 2008/0279298 A1 | 11/2008 | Ben-Yishai et al. | |
| 2008/0279299 A1* | 11/2008 | Reuven et al. | 375/267 |
| 2009/0003499 A1 | 1/2009 | Chiu et al. | |
| 2009/0060079 A1 | 3/2009 | Choi et al. | |
| 2009/0154600 A1 | 6/2009 | Kim et al. | |
| 2009/0196379 A1 | 8/2009 | Gan et al. | |

OTHER PUBLICATIONS

Detert, Thorben, "An Efficient Fixed Complexity QRD-M Algorithm for MIMO-OFDM using Per-Survivor Slicing," *Proc. of the 4th IEEE Int'l. Symposium on Wireless Communication Systems*, Oct. 16-19, 2007, pp. 572-576, Trondheim, Norway.

Amiri, Kiarash et al., "Novel Sort-Free Detector with Modified Real-Valued Decomposition (M-RVD) Ordering in MIMO Systems," *Proc. of the 2008 IEEE Global Telecommunications Conference*, Nov. 30, 2008, pp. 1-5, Piscataway, New Jersey, USA.

Azzam, Luay et al., "Reduced Complexity Sphere Decoding for Square QAM via a New Lattice Representation," *Proc. of the 2007 IEEE Global Telecommunications Conference*, Nov. 1, 2007, pp. 4242-4246, Piscataway, New Jersey, USA.

Azzam, Luay et al., "Reduction of ML Decoding Complexity for MIMO Sphere Decoding, QOSTBC, and OSTBC," *Proc. of the 2008 Information Theory and Applications Workshop*, Jan. 27, 2008, pp. 18-25, Piscataway, New Jersey, USA.

Chen, Sizhong et al., "Relaxed K-Best MIMO Signal Detector Design and VLSI Implementation," *IEEE Transactions on Very Large Scale Integration (VLSI) Systems*, Mar. 2007, pp. 328-337, vol. 15, No. 3.

Kawai, Hiroyuki et al., "Independent Adaptive Control of Surviving Symbol Replica Candidates at Each Stage Based on Minimum Branch Metric in QRM-MLD for OFCDM MIMO Multiplexing," *Proc. of the 2004 IEEE 60th Vehicular Technology Conference*, Sep. 26, 2004, pp. 1558-1564, vol. 3, Piscataway, New Jersey, USA.

Lin, Hsin-Lei et al., "A High-Speed SDM-MIMO Decoder Using Efficient Candidate Searching for Wireless Communication," *IEEE Transactions on Circuits and Systems—II: Express Briefs*, Mar. 2008, pp. 289-293, vol. 55, No. 3.

Mondal, Sudip, "A Novel Approach for K-Best MIMO Detection and its VLSI Implementation," *Proc. of the 2008 IEEE International Symposium on Circuits and Systems*, May 18, 2008, pp. 936-939, Piscataway, New Jersey, USA.

Myllylä, Markus et al., "Implementation Aspects of List Sphere Detector Algorithms," *Proc. of the 2007 IEEE Global Telecommunications Conference*, Nov. 1, 2007, pp. 3915-3920, Piscataway, New Jersey, USA.

Myllylä, Markus et al., "A List Sphere Detector Based on Dijkstra's Algorithm for MIMO-OFDM Systems," *Proc. of the 2007 IEEE 18th Annual Symposium on Personal, Indoor and Mobile Radio Communications*, Sep. 1, 2007, pp. 1-5, Piscataway, New Jersey, USA.

Wu, Yi Hsuan, "Early-Pruned K-Best Sphere Decoding Algorithm Based on Radius Constraints," *Proc. of the 2008 IEEE International Conference on Communications*, May 19, 2008, pp. 4496-4500, Piscataway, New Jersey, USA.

Huang, Liang et al.; "Better k-best Parsing"; Proceedings of the Ninth International Workshop on Parsing Technologies (IWPT); Oct. 2005; Copyright 2005 Association for Computational Linguistic; pp. 53-64.

Guo, Zhan et al.; "A Low Complexity Soft-Output MIMO Decoding Algorithm"; Advances in Wired and Wireless Communication; IEEE/Sarnoff Symposium; 2005 IEEE; pp. 90-93.

Wong, Kwan-wei et al.; "A VLSI Architecture of a K-Best Lattice Decoding Algorithm for MIMO Channels"; Circuits and Systems; 2002; ISCA 2002; IEEE International Symposium; Copyright 2002 IEEE; pp. III-273-III-276.

Damen, Mohamed Oussama et al.; "On Maximum-Likelihood Detection and the Search for the closest Lattice Point"; IEEE Transactions on Information Theory; vol. 49, No. 10; Oct. 2003; pp. 2389-2402.

Burg, Andreas et al.; "VLSI Implementation of MIMO Detection Using the Sphere Decoding Algorithm"; IEEE Journal of Solid-State Circuits; vol. 40, No. 7; Jul. 2005; Copyright 2005 IEEE; pp. 1566-1577.

Amiri, Kiarash et al.; "FPGA Implementation of Dynamic Threshold Sphere Detection for MIMO Systems"; 40th Asilomar Conference on Signals, Systems, and Computers; Nov. 2006; pp. 94-98.

Guo, Zhan et al.; A 53.3 Mb/s 4×4 16-QAM MIMO Decoder in 0.35-µm CMOS; IEEE International Symposium on Circuits and Systems; vol. 5; Copyright 2005 IEEE; May 2005; pp. 4947-4950.

Bengough, Peter A. et al.; "Sorting-Based VLSI Architectures for the *M*-Algorithm and *T*-Algorithm Trellis Decoders"; Copyright 1995 IEEE; IEEE Transactions on Communications, vol. 43, No. 2/3/4, Feb. / Mar. / Apr. 1995; pp. 514-522.

Xilinx, Inc.; U.S. Appl. No. 12/170,468; by Kiarash Amiri et al.; filed Jul. 10, 2008.

Xilinx, Inc.; U.S. Appl. No. 12/025,971; by Kiarash Amiri et al.; filed Feb. 5, 2008.

Xilinx, Inc.; U.S. Appl. No. 12/170,474; by Kiarash Amiri et al.; filed Jul. 10, 2008.

Xilinx, Inc.; U.S. Appl. No. 12/193,106; by Christopher H. Dick et al.; filed Aug. 18, 2008.

\* cited by examiner

DETECTOR USING LIMITED SYMBOL CANDIDATE GENERATION FOR MIMO COMMUNICATION SYSTEMS

FIELD OF THE INVENTION

The present invention generally relates to a communication system employing multiple transmit and multiple receive antennas in a spatial multiplexing multiple-input and multiple-output (MIMO) configuration, and more particularly to symbol detection for multiple receive and transmit antennas.

BACKGROUND

Data can be transmitted electromagnetically between a transmitting and a receiving antenna. A transmitter encodes the data into a sequence of symbols selected from a signal constellation and transmits the symbols from the transmitting antenna to the receiving antenna. A receiver detects the symbols at the receiving antenna.

Interference from noise and reflections corrupts the symbols received by the receiving antenna. For a maximum-likelihood detector, the receiver can compare the received signal with the expected received signal for all of the symbols in the constellation. The expected received signal that most closely matches the actually received signal provides the detected symbol.

A measurement of the characteristics of the communication medium helps proper symbol detection. In one example, the transmitter periodically transmits a known pattern of symbols to the receiver and the receiver uses the known pattern to determine the characteristics, such as multiple signal propagation paths, of the communication medium.

The data transfer rate of electromagnetic communication increases by transmitting multiple symbols in parallel from multiple transmitting antennas. The detection of the multiple transmitted symbols improves by receiving the symbols with multiple receiving antennas.

For maximum-likelihood detection with multiple transmitting antennas, the number of possible combinations of symbols transmitted in parallel is the degree of the constellation raised to the power of the number of transmitting antennas. Evaluation of all possible combinations is infeasible for higher order modulation and a large number of antennas.

The present invention may address one or more of the above issues.

SUMMARY

Various embodiments of the invention provide a circuit for detecting symbols transmitted from multiple transmitting antennas and received at multiple receiving antennas. A distance block is associated with an initial transmitting antenna in an ordering of the transmitting antennas. The distance block determines a distance value for each symbol in a constellation. A selector block selects a limited number of candidates for the initial transmitting antenna from the symbols having smaller values of the distance values. For each first transmitting antenna succeeded by a second transmitting antenna in the ordering, a distance-selector block associated with the second transmitting antenna selects a respective candidate for the second transmitting antenna for each candidate for the first transmitting antenna. The respective candidate for the second transmitting antenna is selected from pairings that include a corresponding pairing for each symbol in the constellation. The corresponding pairing includes the candidate for the first transmitting antenna and the symbol in the constellation. The distance-selector block determines a distance value for each of the pairings. The respective candidate for the second transmitting antenna is one of the pairings having a smaller value of a distance value. An identifier block selects a last candidate having a smaller value of the distance value among the candidates for a last transmitting antenna in the ordering. The distance-selector blocks are coupled in a sequence according to the ordering between the selector block and the identifier block. The last candidate includes the symbols detected as transmitted by the transmitting antennas.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

Figure 1:
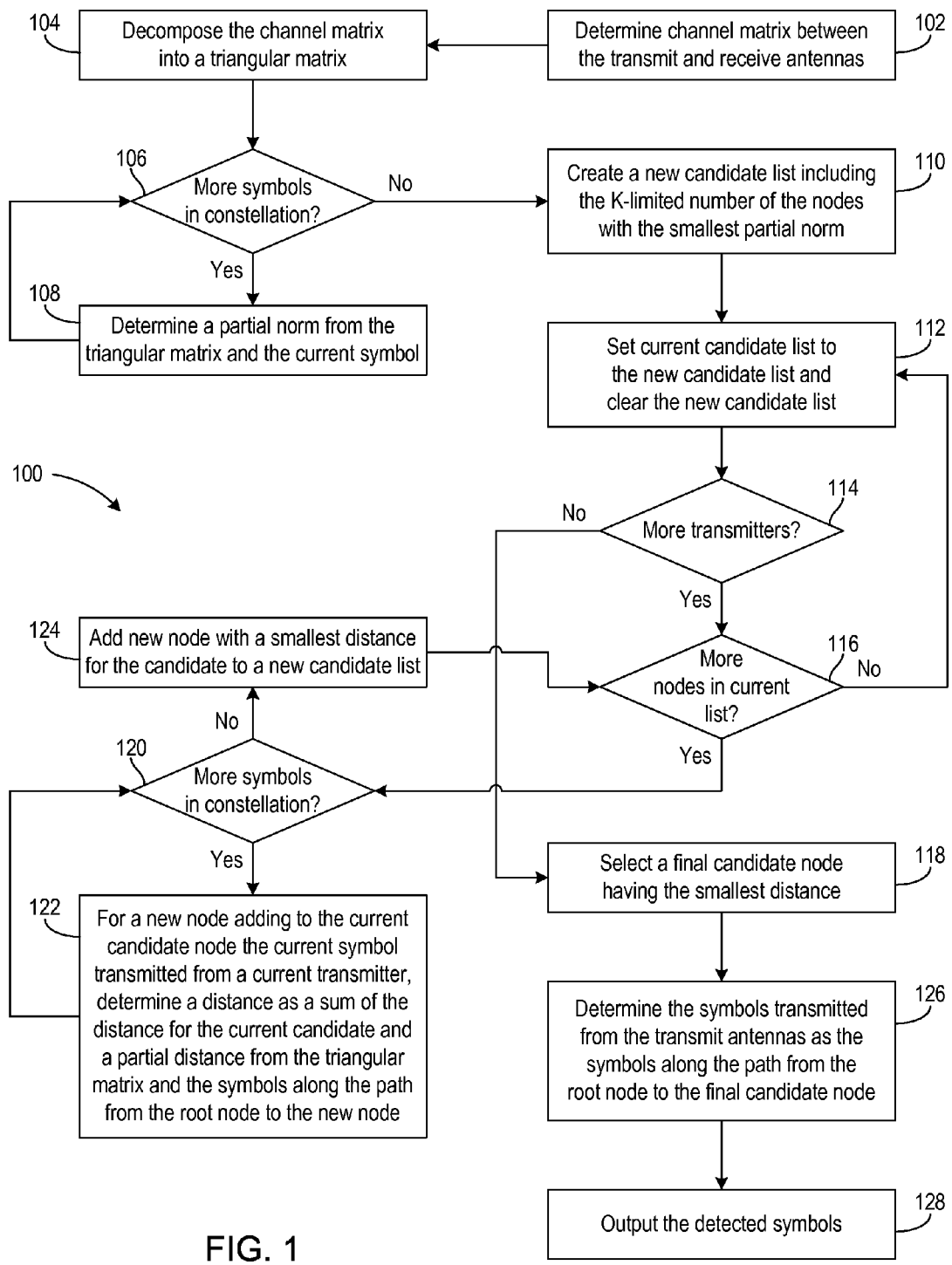
FIG. 1 is a flow diagram of a process for detecting symbols received at multiple input antennas and transmitted from multiple output antennas in accordance with various embodiments of the invention.

FIG. 1 is a flow diagram of a process 100 for detecting symbols received at multiple input antennas and transmitted from multiple output antennas (MIMO) in accordance with various embodiments of the invention. While a maximum-likelihood detector detects the transmitted symbols by considering all combinations of each transmitting antenna transmitting every possible symbol in a constellation, process 100 considers a subset of all of these combinations.

At step 102, a channel matrix is determined for the communication channel between the transmitting and receiving antennas. A model for the communication channel is:

$$y = Hs + n$$

where H is an N×M channel matrix between the N receiving antennas and the M transmitting antennas, s is a column vector of M symbols transmitted from the transmitting antennas, n is a column vector of N received noise elements, and y is a column vector of N signals received at the receiving antennas. Each of the M transmitted symbols in column vector s is a symbol from a constellation having an order of w symbols.

At step 104, process 100 decomposes the channel matrix into a triangular matrix. In one embodiment, the triangular matrix is an upper triangular matrix from a QR decomposition of the channel matrix. The detection of the transmitted symbols includes determining the M symbols in column vector s that minimize the distance norm:

$$D(s) = \|y - Hs\|^2$$
$$= \|Q^H y - Rs\|^2$$
$$= \sum_{i=M}^{1} \left| y'_i - \sum_{j=i}^{M} R_{ij} s_j \right|^2$$

where H=QR, $QQ^H$=I, and y'=$Q^H$y. The summations derive from R being an upper triangular matrix. The outer summation from i=M down to 1 is a summation of a corresponding term for each of the transmitting antennas beginning from the last antenna. The corresponding term of the outer summation for each transmitting antenna is denoted the partial distance for the transmitting antenna. The partial distance for a particular transmitting antenna with index i includes an inner summation of a weighting of the candidate symbols from transmitting antennas i to M. Thus, the QR decomposition permits calculating the distance norm D(s) for candidate symbols s by summing a partial distance for each index of a transmitting antenna, and the partial distance for each index is a function of the symbols having the same and larger indices.

The receiver detects the transmitted symbols by computing the distance norm for various combinations selected from all combinations of M symbols in the constellation. The M symbols actually transmitted from the M transmitting antennas should match the combination that has the smallest value of the distance norm.

Process 100 determines a partial distance for a first transmitting antenna transmitting every symbol in the constellation. The symbols with the smaller partial distances are more likely to match the actual symbol transmitted by the first transmitting antenna. The symbols with the smaller partial distances are the candidates for the first transmitting antenna. Process 100 creates candidates for all the other transmitting antennas from these candidates for the first transmitting antenna. The candidate having a smallest distance norm for the last transmitting antenna provides the detected symbols.

Decision 106 checks whether the constellation includes additional symbols that could be the symbol transmitted by the first transmitting antenna. If there is another symbol in the constellation, process 100 proceeds to step 108; otherwise, process 100 proceeds to decision 110. At step 108, a partial norm is determined for the first transmitting antenna transmitting the current symbol. For the first transmitting antenna, the partial norm is the partial distance for the current symbol. In one embodiment, a search graph includes a node for each symbol that the first transmitting antenna could transmit.

At step 110, the candidates for the first transmitting antenna are a limited number of the nodes from step 108 with the smaller partial norms. In one embodiment, a candidate list includes a predetermined number of the nodes having the smallest partial norms. At step 112, the candidate list becomes the current candidate list. Iteration of process 100 creates new candidate lists for each additional transmitting antenna and process 100 sets the current candidate list to the new candidate list at step 112.

Decision 114 checks whether the current transmitter is the last transmitter. If there are more transmitters, process 100 proceeds to decision 116; otherwise, process 100 proceeds to step 118. Decision 116 checks whether the current candidate list includes more nodes. If there are more nodes in the current candidate list, process 100 proceeds to decision 120 to process the current candidate node; otherwise, process 100 returns to step 112 to process a newly created candidate list for the current transmitting antenna.

Decision 120 checks whether the constellation includes additional symbols. If there is another symbol in the constellation, process 100 proceeds to step 122; otherwise, process 100 proceeds to step 124.

At step 122, a partial norm is determined for a new node that pairs the current candidate node with the current symbol. The partial norm gives a relative likelihood that the current transmitter transmitted the current symbol, while presuming the appropriate antennas transmit the symbols of the current candidate node. The partial norm of the new node is a sum of the partial norm of the current candidate and a partial distance of the current symbol. The partial distance of the current symbol is calculated from the signals received at the receiving antennas, the triangular decomposition of the channel matrix, the symbols of the current candidate, and the current symbol.

At step 124, the new node with the smallest distance for the current candidate node is added to a new candidate list for the current transmitting antenna. Thus, the new candidate list includes one new candidate for each current candidate in the current candidate list. The new candidate list has the same number of new candidates as the original candidate list for the first transmitting antenna.

At step 118, a final candidate is selected that has the smallest norm. The final candidate provides the detected symbols as the symbols included in the final candidate along the path from the root node to the final candidate node. These symbols are detected as transmitted from the transmitting antennas at step 126. The detected symbols are output at step 128.

Figure 2:
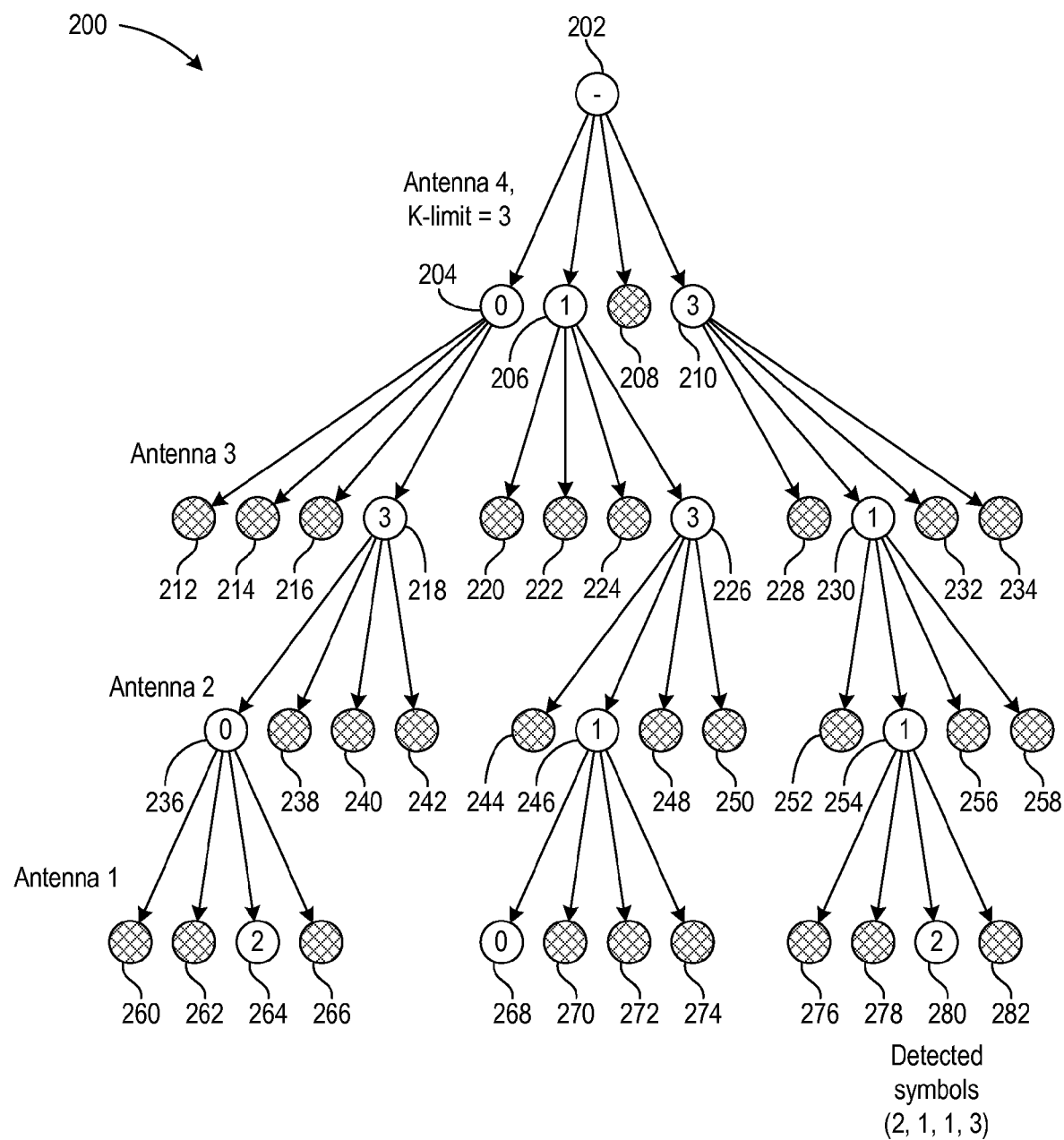
FIG. 2 is a graph diagram of an example tree illustrating a process of selecting candidates for detecting symbols communicated between multiple transmitting and receiving antennas in accordance with various embodiments of the invention.

FIG. 2 is a graph diagram of an example tree 200 illustrating a process of selecting candidates for detecting symbols communicated between multiple transmitting and receiving antennas in accordance with various embodiments of the invention. The example tree 200 has a level for each of four transmitting antennas transmitting one of four symbols in a constellation.

The example tree 200 has a root node 202 representing a null candidate with zero selected symbols. The first level of nodes 204, 206, 208, and 210 respectively represent antenna-4 transmitting a 0-symbol, a 1-symbol, a 2-symbol, and a 3-symbol in the constellation. A partial distance is calculated for each node 204, 206, 208, and 210. For the first level, this partial distance for each node 204, 206, 208, or 210 is a partial norm that provides a relative likelihood that the corresponding symbol was actually transmitted by transmitting antenna-4.

The nodes 204, 206, 208, and 210 having the smallest partial norms are selected as candidates at the first transmitting antenna. The number of candidates selected is a limited number, such as three in this example tree 200. The selected candidate nodes 204, 206, and 210 having the smallest partial distances are labeled with the corresponding candidate symbol, and the eliminated node 208 is shown shaded to indicate that the first transmitting antenna probably did not transmit symbol-2.

The selected candidate nodes 204, 206, and 210 are expanded in the second level to add antenna-3 transmitting each possible symbol in the constellation.

Candidate node 204 is expanded to include node 212 representing antenna-4 and antenna-3 both transmitting symbol-0, node 214 representing antenna-4 transmitting symbol-0 and antenna-3 transmitting symbol-1, node 216 representing antenna-4 transmitting symbol-0 and antenna-3 transmitting symbol-2, and node 218 representing antenna-4 transmitting symbol-0 and antenna-3 transmitting symbol-3. Partial distances are calculated for each of nodes 212 through 218, and these partial distances are added to the partial norm of candidate node 204 to give respective partial norms for nodes 212 through 218. The partial norms for nodes 212 through 218 provide a relative likelihood that antenna-4 and antenna-3 actually transmitted the corresponding symbols.

The partial norms of nodes 212 through 218 are compared and the node 218 having the smallest partial distance among nodes 212 through 218 is selected as a candidate. Similarly, node 226 is selected as a candidate because node 226 has the smallest partial distance among nodes 220 through 226, and node 230 is selected as a candidate because node 230 has the smallest partial distance among nodes 228 through 234. Thus, new candidate node 218 is created from candidate node 204, new candidate node 226 is created from candidate node 206, and new candidate node 230 is created from candidate node 210. The number of candidate nodes 218, 226, and 230 for antenna-3 equals the number of candidate nodes 204, 206, and 210 for antenna-4.

At the next level for antenna-2, the three candidate nodes 218, 226, and 230 are expanded and corresponding partial norms are calculated for nodes 236 through 258. Node 236 is selected as a candidate because node 236 has the smallest partial distance among nodes 236 through 242, node 246 is selected as a candidate because node 246 has the smallest partial distance among nodes 244 through 250, and node 254 is selected as a candidate because node 254 has the smallest partial distance among nodes 252 through 258.

At the last level for antenna-1, the three candidate nodes 236, 246, and 254 are expanded and corresponding partial norms are calculated for nodes 260 through 282. Because this is the last level, the calculated partial norms are complete distance norms. Node 264 is selected as a candidate because node 264 has the smallest norm among nodes 260 through 266, node 268 is selected as a candidate because node 268 has the smallest norm among nodes 268 through 274, and node 280 is selected as a candidate because node 280 has the smallest norm among nodes 276 through 282.

The partial norms of candidate nodes 264, 268, and 280 are complete distance norms. The norms of nodes 264, 268, and 280 are compared and node 280 is selected as having the smallest norm in this example. The symbols along the path from final candidate node 280 to the root node 202 are the symbols detected as transmitted from the transmitting antennas.

Example tree 200 includes a total of 41 nodes 202 through 282. For maximum-likelihood detection, a corresponding tree includes a total of 341 nodes. The search of tree 200 provides increased efficiency by pruning the nodes that are unlikely to correspond to the actually transmitted symbols.

Figure 3:
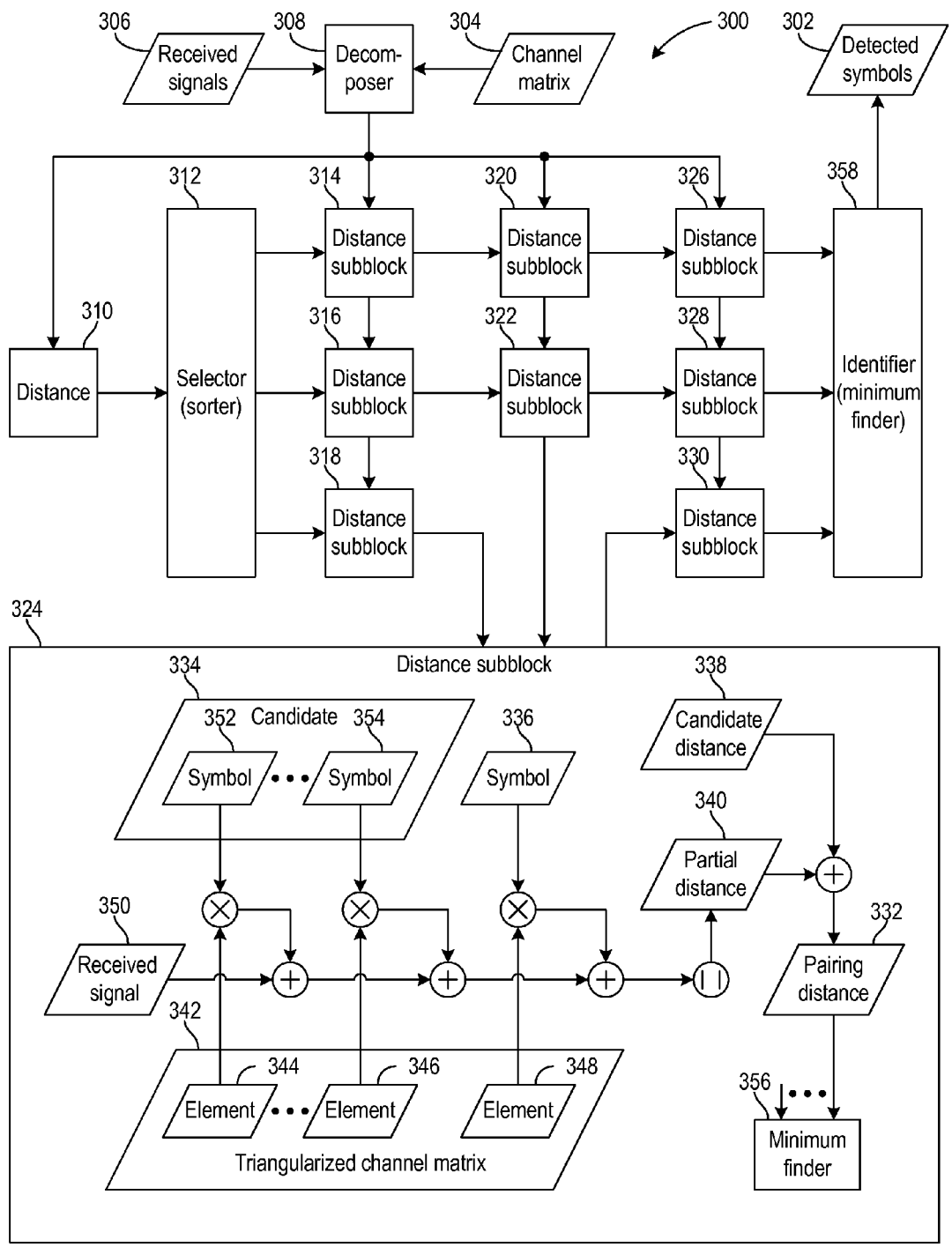
FIG. 3 is a block diagram of a circuit for detection of symbols communicated from multiple transmitting antennas to multiple receiving antennas in accordance with various embodiments of the invention.

FIG. 3 is a block diagram of a circuit 300 for detection of symbols communicated from multiple transmitting antennas to multiple receiving antennas in accordance with various embodiments of the invention. Circuit 300 produces detected symbols 302 from channel matrix 304 and the received signals 306.

Decomposer 308 transforms the channel matrix 304 into a triangular matrix using a QR decomposition, for example. Decomposer 308 also transforms the received signals 306 according to the decomposition of the channel matrix 304.

Distance block 310 determines partial distances for a first transmitting antenna transmitting each symbol in a constellation. For this first transmitting antenna, the partial distances are also partial norms giving a relative likelihood of the first transmitting antenna transmitting each of the symbols in the constellation. For an example of a constellation that has an order of w symbols, distance block 310 provides w partial norms to selector 312. In one embodiment, distance block 310 determines a partial distance for each pairing of a null candidate and each symbol in a constellation.

Selector 312 selects candidates that have smaller values of the w partial norms. In one embodiment, selector 312 sorts the w partial norms in ascending order and selects from the beginning of the ascending order a predetermined number of the smallest partial norms. For example, selector 312 selects the three smallest of the w partial norms. The selected candidates are sent to respective distance subblocks 314, 316, and 318.

Collectively, distance subblocks 314, 316, and 318 form a distance block for a second transmitting antenna. Each distance subblock 314, 316, and 318 includes a function similar to distance block 310. For example, distance subblock 314 determines partial norms for the second transmitting antenna transmitting each of the w symbols in the constellation along with the first transmitting antenna transmitting the candidate symbol selected by selector 312 for distance subblock 314. Distance subblock 314 calculates the partial norm for each symbol in the constellation as the sum of the partial norm of the candidate from selector 312 and a partial distance for the second transmitting antenna transmitting the symbol. In addition, distance subblock 314 selects a candidate having the smallest partial norm. Distance subblock 316 similarly selects a candidate that includes a first symbol for the first transmitting antenna and a second symbol for the second transmitting antenna, with the second symbol likely transmitted by the second transmitting antenna presuming the first transmitting antenna transmitted the first symbol. Distance subblock 318 similarly expands the candidate selected by selector 312 for distance subblock 318 by adding a symbol for the second transmitting antenna to the candidate.

Distance subblocks 320, 322, and 324 collectively form a distance block for a third transmitting antenna, and distance subblocks 326, 328, and 330 collectively form a distance block for a fourth transmitting antenna. Each distance subblock 320, 322, 324, 326, 328, or 330 adds a likely symbol transmitted from a corresponding antenna to an input candidate.

Distance subblock 324 determines a distance norm 332 for the pairing of a candidate 334 and each possible symbol 336 in a constellation. For clarity, FIG. 3 shows the calculation of the pairing distance norm 332 for only one symbol 336 in the constellation. The distance norm 332 for the pairing is a sum of a previously determined distance norm 338 for the candidate 334 and a partial distance 340 for the pairing of the candidate 334 and the symbol 336.

The channel matrix 304 is transformed into a triangular matrix 342 with a row of elements 344 through 346, 348 for the transmitting antenna that corresponds to the distance subblock 324. During the transformation of the channel matrix into a triangular matrix, the received signals 306 are correspondingly transformed into the received signal 350. The partial distance 340 is a norm of a sum of the transformed received signal 350 and a weighted sum of the symbols 352 through 354 and 336. The symbols 352 through 354 from candidate 334 and the symbol 336 from the constellation have a weight given by the row of elements 344 through 346 and 348 in the triangular matrix 342.

If distance norm 332 for a particular symbol 336 has the smallest value among all symbols in the constellation, minimum finder 356 outputs the candidate that pairs the candidate 334 and the symbol 336. This new candidate recursively includes symbols 336 and 352 through 354.

Identifier 358 selects the final candidate having the smallest distance norm among the three candidates from distance subblocks 326, 328, and 330. The final candidate corresponds to the selection of a corresponding symbol for each transmitting antenna and these symbols for the transmitting antennas are the detected symbols 302.

Figure 4:
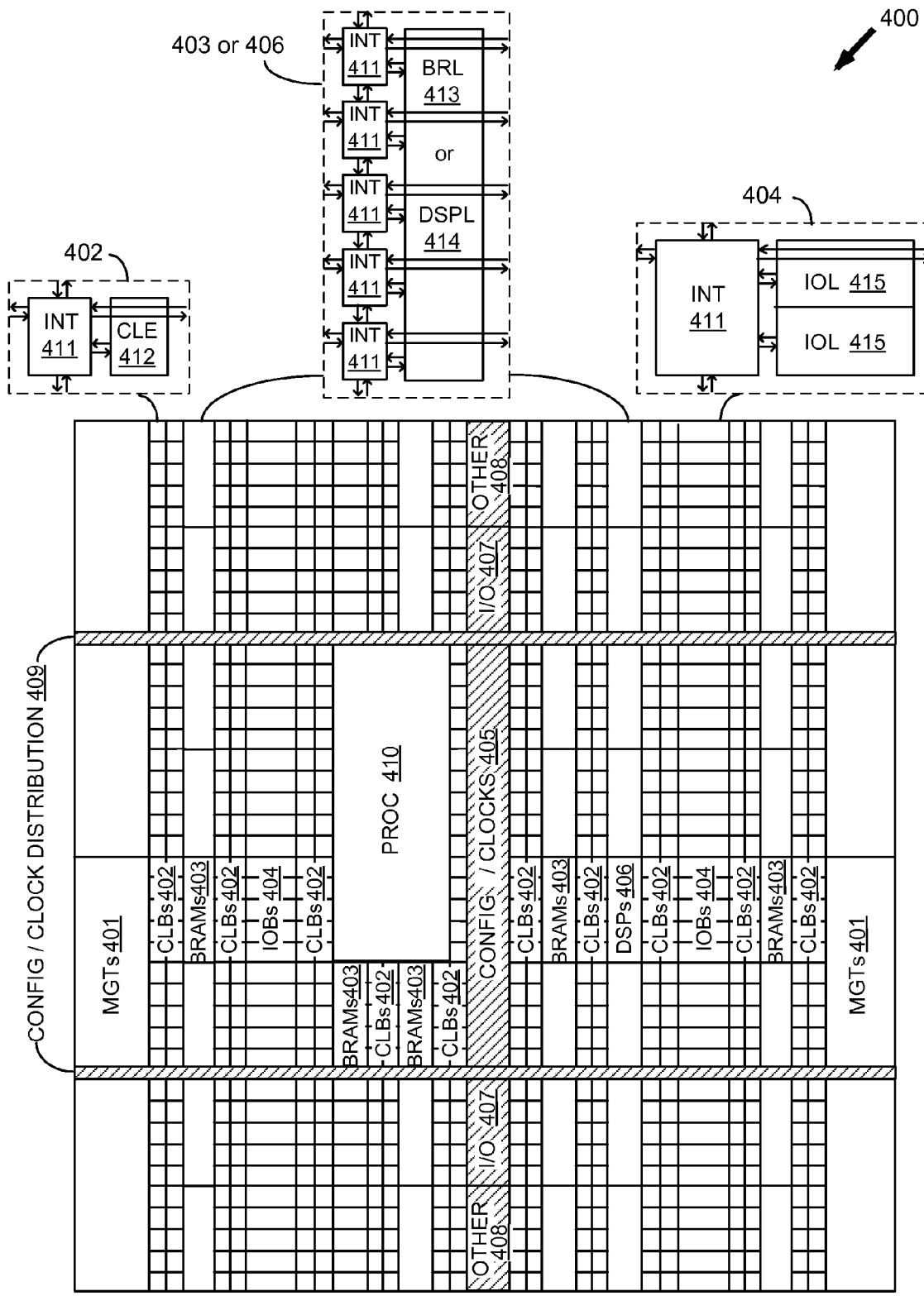
FIG. 4 is a block diagram of an exemplary programmable integrated circuit for implementing symbol detection in accordance with one or more embodiments of the invention.

FIG. 4 is a block diagram of a programmable integrated circuit for implementing symbol detection in accordance with one or more embodiments of the invention. The exemplary illustrated circuit is a programmable logic device (PLD), specifically a Field Programmable Gate Array (FPGA). It will be clear to those of skill in the art, however, that the methods of the invention can be practiced using other types of integrated circuits and/or systems. For example, some embodiments of the invention may utilize Application Specific Integrated Circuits (ASICs), non-programmable integrated circuits, partially programmable integrated circuits, and/or electronic systems other than integrated circuits. It will be clear to those of skill in the art that the invention can be implemented within these and other architectural variations.

Advanced programmable logic devices can include several different types of programmable logic blocks in the array. For example, FIG. 4 illustrates an FPGA architecture 400 that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407) (e.g., configuration ports and clock ports), and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element (INT 411) also includes the connections to and from the programmable logic element within the same tile, as shown by the examples included at the top of FIG. 4.

For example, a CLB 402 can include a configurable logic element (CLE 412) that can be programmed to implement user logic plus a single programmable interconnect element (INT 411). A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element (INT 411). As will be clear to those of skill in the art, the actual I/O pads connected, for example, to the I/O logic element 415 typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 5:
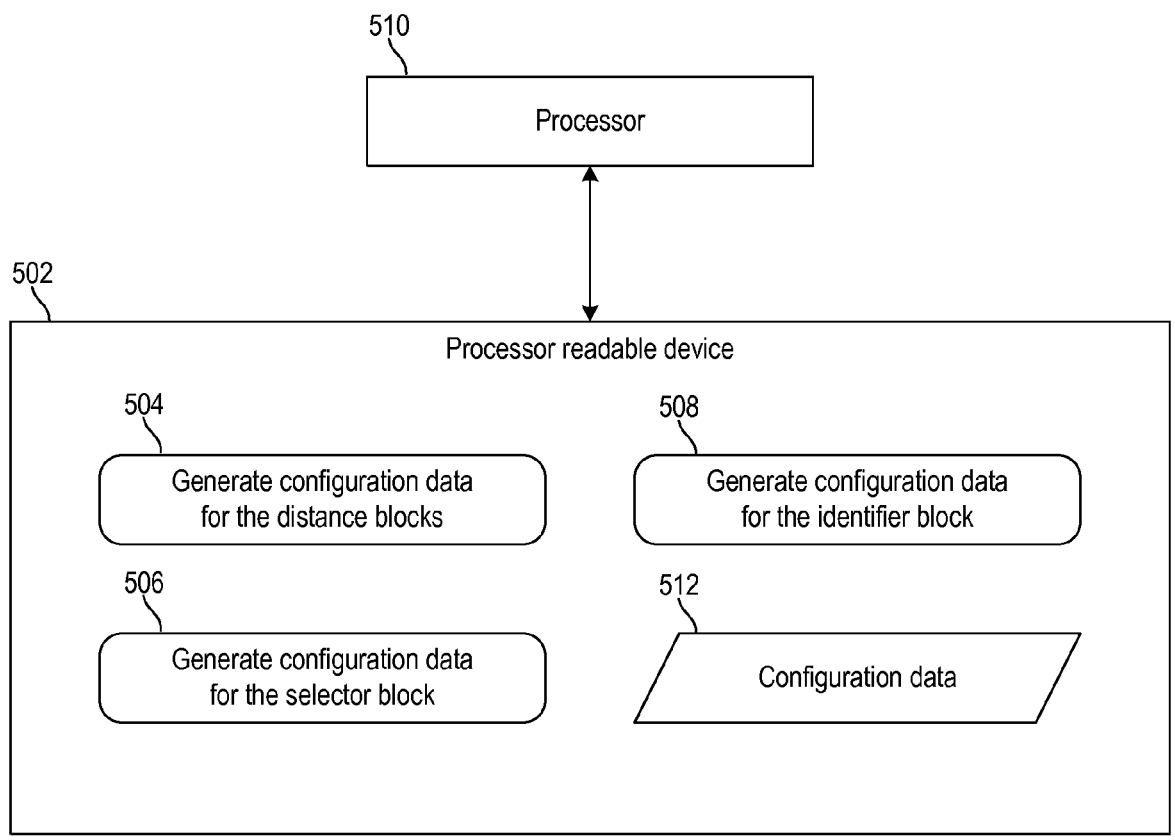
FIG. 5 is a block diagram of a system for generating configuration data for implementing symbol detection in a programmable integrated circuit in accordance with one or more embodiments of the invention.

FIG. 5 is a block diagram of a system for generating configuration data for implementing symbol detection in a programmable integrated circuit in accordance with one or more embodiments of the invention. Processor-readable device 502 is configured with software modules 504, 506, and 508. Execution of the instructions of software modules 504, 506, and 508 by processor 510 causes processor 510 to generate configuration data that implements MIMO symbol detection in a programmable integrated circuit. In one embodiment, the generated configuration data 512 is stored on the processor readable device 502.

Execution of the instructions of software module 504 causes processor 510 to generate configuration data for the distance blocks and distance-selector blocks (i.e., distance subblocks). Execution of the instructions of software module 506 causes processor 510 to generate configuration data for the selector block. Execution of the instructions of software module 508 causes processor 510 to generate configuration data for the identifier block.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems for detecting symbols transmitted from multiple transmitting antennas and received at multiple receiving antennas. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A communication system for detecting symbols transmitted from a plurality of transmitting antennas and received at a plurality of receiving antennas using a plurality of candidates for each transmitting antenna, comprising:

for an initial transmitting antenna in an ordering of the transmitting antennas, means for determining a distance value for each of a plurality of symbols in a constellation;

means for sorting the distance values;

means for selecting a limited number of candidates for the initial transmitting antenna from the symbols having smaller values of the distance values, the limited number being less than a total number of symbols in the constellation;

for each first transmitting antenna succeeded by a second transmitting antenna in the ordering, the plurality of transmitting antennas including three or more transmitting antennas, respective means for selecting a respective candidate for the second transmitting antenna for each candidate selected for the first transmitting antenna, each respective candidate for the second transmitting antenna being selected from a respective plurality of pairings, each respective plurality of pairings including a corresponding pairing for each of the symbols in the constellation, each corresponding pairing including the candidate selected for the first transmitting antenna and the symbol in the constellation, wherein the means for selecting includes means for determining distance values for the pairings in the respective plurality of pairings, and independent of distance values of pairings in any other plurality of pairings select from the respective plurality of pairings the respective candidate for the second transmitting antenna that has a smallest value of the distance values of the pairings in the respective plurality of pairings; and means for selecting a last candidate that has a smaller value of the distance values among the candidates for a last transmitting antenna in the ordering, wherein the last candidate includes the symbols detected as transmitted by the transmitting antennas.

2. A circuit for detecting symbols transmitted from a plurality of transmitting antennas and received at a plurality of receiving antennas (MIMO) using a plurality of candidates for each transmitting antenna, comprising:

a distance block associated with an initial transmitting antenna in an ordering of the transmitting antennas, the distance block for determining a distance value for each of a plurality of symbols in a constellation;

a selector block coupled to the distance block, the selector block configured to sort the distance values and select a limited number of candidates for the initial transmitting antenna from the symbols having smaller values of the distance values, the limited number being less than a total number of symbols in the constellation;

for each first transmitting antenna succeeded by a second transmitting antenna in the ordering, the plurality of transmitting antennas including three or more transmitting antennas, a respective distance-selector block associated with the second transmitting antenna for selecting a respective candidate for the second transmitting antenna for each candidate selected for the first transmitting antenna, each respective candidate for the second transmitting antenna being selected from a respective plurality of pairings, each respective plurality of pairings including a corresponding pairing for each of the symbols in the constellation, each corresponding pairing including the candidate selected for the first transmitting antenna and the symbol in the constellation, wherein the respective distance-selector block is configured to determine distance values for the pairings in the respective plurality of pairings, and independent of distance values of pairings in any other plurality of pairings select from the respective plurality of pairings the respective candidate for the second transmitting antenna that has a smallest value of the distance values of the pairings in the respective plurality of pairings;

an identifier block for selecting a last candidate having a smaller value of the distance values among the candidates for a last transmitting antenna in the ordering, wherein the distance-selector blocks are coupled in a sequence between the selector block and the identifier block according to the ordering of transmitting antennas, and the last candidate includes the symbols detected as transmitted by the transmitting antennas.

3. The circuit of claim 2, wherein the distance block determines the distance value for the initial transmitting antenna transmitting each symbol in the constellation.

4. The circuit of claim 2, wherein the distance block determines the distance value for each symbol in the constellation in response to a channel matrix for the transmitting and receiving antennas.

5. The circuit of claim 2, wherein the selector block sorts the distance values from the distance block in ascending order and selects the candidates for the initial transmitting antenna as the limited number of the pairings having the distance values at a beginning of the ascending order.

6. The circuit of claim 2, wherein each of the distance-selector blocks includes the limited number of a plurality of sub-blocks, each of the sub-blocks for determining the distance value for each pairing of one candidate and the symbols in the constellation, and for selecting the pairing having a smallest value of the distance value.

7. The circuit of claim 2, wherein the distance-selector block associated with each transmitting antenna other than the initial transmitting antenna determines a distance value for the transmitting antenna transmitting each symbol in the constellation for each candidate for the transmitting antenna.

8. The circuit of claim 2, wherein each distance-selector block determines the distance value for each pairing of a candidate and a symbol in response to a channel matrix for the transmitting and receiving antennas.

9. The circuit of claim 2, wherein each distance-selector block determines the distance value for each pairing of a candidate and a symbol as a sum of the distance value of the pairing for the candidate and a partial distance value for the symbol.

10. The circuit of claim 2, wherein the respective distance-selector block associated with each transmitting antenna other than the initial transmitting antenna selects each candidate that includes a corresponding one of the symbols in the constellation for each transmitting antenna that precedes the transmitting antenna that is associated with the distance-selector block in the ordering.

11. The circuit of claim 2, wherein each distance-selector block selects the respective candidate having a smallest value of the distance values among the pairings, and the identifier block selects the last candidate having the smallest value of the distance value among the candidates for the last transmitting antenna.

12. The circuit of claim 2, wherein the identifier block selects the final candidate that includes, for each transmitting antenna, a respective one of the symbols that is detected as transmitted from the transmitting antenna.

13. A program storage medium, comprising:

a processor-readable device configured with instructions, wherein execution of the instructions by one or more processors causes the one or more processors to perform operations including generating configuration data for a programmable integrated circuit that implements, a distance block associated with an initial transmitting antenna in an ordering of a plurality of transmitting antennas, the distance block for determining a distance value for each of a plurality of symbols in a constellation;

a selector block coupled to the distance block, the selector block configured to sort the distance values and select a limited number of candidates for the initial transmitting antenna from the symbols having smaller values of the distance values, the limited number being less than a total number of symbols in the constellation;

for each first transmitting antenna succeeded by a second transmitting antenna in the ordering, the plurality of transmitting antennas including three or more transmitting antennas, a respective distance-selector block associated with the second transmitting antenna for selecting a respective candidate for the second transmitting antenna for each candidate selected for the first transmitting antenna, each respective candidate for the second transmitting antenna being selected from a respective plurality of pairings, each respective plurality of pairings including a corresponding pairing for each of the symbols in the constellation, each corresponding pairing including the candidate selected for the first transmitting antenna and the symbol in the constellation, wherein the distance-selector block is configured to determine distance values for the pairings in the respective plurality of pairings, and independent of distance values of pairings in any other plurality of pairings select from the respective plurality of pairings the respective candidate for the second transmitting antenna that has a smallest value of the distance values of the pairings in the respective plurality of pairings; and an identifier block for selecting a last candidate having a smaller value of the distance values among the candidates for a last transmitting antenna in the ordering, wherein the distance-selector blocks are coupled in a sequence between the selector block and the identifier block according to the ordering of the transmitting antennas, and the last candidate includes the symbols detected as transmitted by the transmitting antennas.

14. The program storage medium of claim 13, wherein the distance block determines the distance value for the initial transmitting antenna transmitting each symbol in the constellation, and the distance-selector block associated with each transmitting antenna other than the initial transmitting antenna determines the distance value for the transmitting antenna transmitting each symbol in the constellation for each candidate for the transmitting antenna.

15. The program storage medium of claim 13, wherein the distance block determines the distance value for each symbol in the constellation in response to a channel matrix for the transmitting and receiving antennas, and each distance-selector block determines the distance value for each pairing of a candidate and a symbol in response to the channel matrix.

16. The program storage medium of claim 13, wherein the identifier block selects the final candidate that includes, for each transmitting antenna, a respective one of the symbols that is detected as transmitted from the transmitting antenna.

17. The circuit of claim 2, wherein each distance-selector block determines the distance value for each pairing of a candidate and a symbol from a partial distance value for the symbol calculated as a function of the symbol and each symbol included in the candidate from a previous distance-selector block in the sequence.

18. The program storage medium of claim 13, wherein each distance-selector block determines the distance value for each pairing of a candidate and a symbol as a sum of the distance value of the pairing for the candidate and a partial distance value for the symbol calculated as a function of the symbol and each symbol included in the candidate from a previous distance-selector block in the sequence.

* * * * *